(No Model.)
G. R. PEARE.
BRAKE FOR CHILDREN'S CARRIAGES.
No. 264,415. Patented Sept. 12, 1882.
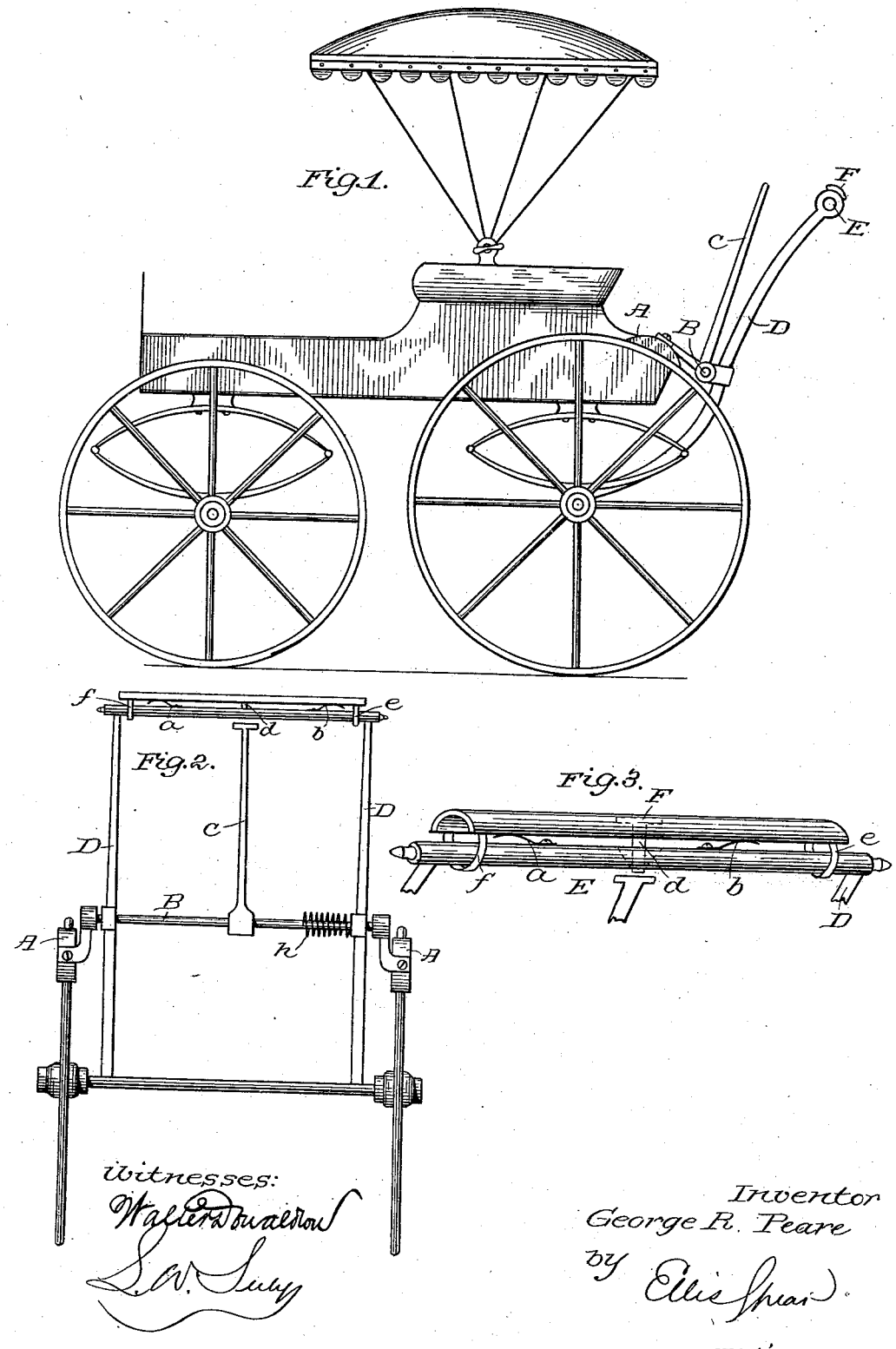
Witnesses:
Inventor
George R. Peare
by Ellis Spear
Atty.

UNITED STATES PATENT OFFICE.

GEORGE R. PEARE, OF LYNN, MASSACHUSETTS.

BRAKE FOR CHILDREN'S CARRIAGES.

SPECIFICATION forming part of Letters Patent No. 264,415, dated September 12, 1882.

Application filed January 24, 1882. (No model.)

*To all whom it may concern:*

Be it known that I, GEORGE R. PEARE, residing at Lynn, in the county of Essex and Commonwealth of Massachusetts, have invented certain new and useful Improvements in Brakes for Hand-Vehicles, of which the following, taken in connection with the accompanying drawings, is a specification.

The invention relates to that class of vehicles commonly propelled by hand; and it consists in combining with rigidly-attached propelling-handles an independent automatic brake mechanism and a locking device carried by the handle, whereby the brake is prevented from bearing on the wheel until released from the locking device.

In the accompanying drawings, Figure 1 is a side elevation of an entire carriage embodying my invention. Fig. 2 is a front elevation of two wheels and a propeller-shaft, all detached from the rest of the vehicle, but embodying my invention. Fig. 3 is a view of the locking device.

The vehicle itself is of well-known construction. The "propeller-shaft," so called because it is the means by which the propelling-power is applied to the vehicle, consists of a cross-round, E, and two parallel side arms, D D. The side arms, D D, are provided with suitable bearings, in which a rock-shaft, B, is journaled, as shown in Fig. 2. Said shaft B carries an arm, H, on each end thereof, which arms H are arranged in line with the wheels of the carriage and have brake-shoes A attached to their outer ends.

The rock-shaft B is surrounded by a spiral spring, $h$, which connects with the shaft at one end and with the side arm, D, at its opposite end. This spring tends to rock the shaft B so as to press the shoes A hard against the wheels of the carriage, so as to stop or retard the momentum thereof.

On the shaft B is a radial arm, C, the length of which is practically equal to the distance from the shaft B to the cross-round E. (See Fig. 2.) It is fixed on the shaft in reference to the arms H, as shown in Fig. 1, so that a movement of the arm C backward into line with the side arms, D, turns the shaft B sufficiently to lift the shoes A off the wheels of the carriage.

On the cross-round E are two springs, $a\,b$, which support and bear upward the curved slab F, as shown in Fig. 3. The action of the springs upward is limited by the straps $e\,f$.

A pin, $d$, is secured to the under side of slab F and plays down through a hole in the cross-round E, which hole is made through the cross round in line with the radial arm C. The length of the pin $d$ is such that with the slab F pushed upward, as in Fig. 3, the arm C will pass freely under the end of the pin; but when the slab F is pressed downward upon the cross-round E the end of the pin will project below the cross-bar, so as to engage with and prevent the arm C from passing.

In propelling the vehicle the hands are supposed to embrace both the slab F and the rod E. The grip ordinarily required in order to move the vehicle along is also quite sufficient to overcome the springs $a\,b$ and force the slab F down upon the cross-round E, thereby depressing the pin $d$ sufficiently to engage with and hold the arm C.

When the vehicle is about to be set in motion the brake-shoes A are lifted off the wheels of the carriage by pushing back the arm C till the end thereof passes the line of the pin $d$. Thereupon the pin $d$ is depressed by a grip of the hand, as before stated, so as to prevent the arm C from returning till the said grip is relaxed or the hand is removed, thereby allowing the springs $a\,b$, by forcing upward the slab F, to withdraw the pin $d$ and allow the arm C to pass forward.

I am aware that prior to this invention hand-vehicles have been provided with mechanism for retarding or stopping the motion thereof. I therefore do not claim such a combination; but What I do claim is—

1. The handle D, in combination with the pivoted lever C, carrying the brake-shoe, and the spring-plate F, having the pin $d$.

2. In combination, the shaft B, carrying the brake-shoes, the lever C, and a locking device attached to the handle.

3. The combination, with the brake-shoes and lever C, of the arm F, having the pin, the springs $a\,b$, and the cross-round E.

In testimony whereof I have signed my name to this specification.

GEO. R. PEARE.

In presence of—
C. B. TUTTLE,
C. C. TUTTLE.